March 15, 1932. W. McKEE 1,849,680
ART OF CONVEYING
Filed March 8, 1926 2 Sheets-Sheet 1

INVENTOR
Willis McKee
BY Richey & Watts
ATTORNEYS

March 15, 1932.                W. McKEE                1,849,680
ART OF CONVEYING
Filed March 8, 1926          2 Sheets-Sheet 2

INVENTOR
Willis McKee
BY
Richey & Watts
ATTORNEYS

Patented Mar. 15, 1932

1,849,680

UNITED STATES PATENT OFFICE

WILLIS McKEE, OF CLEVELAND, OHIO

ART OF CONVEYING

Application filed March 8, 1926. Serial No. 93,134.

This invention relates to the art of conveying material and particularly to the handling of metal bars and the like as they are delivered from a rolling mill.

Heretofore bars have been delivered by the "run-out" of a rolling mill to a conveyor comprising conical skew-rollers and, by skewing the rollers have been delivered sidewise to inclined skids down which they have been separately moved with a step-by-step motion at the same time being cooled. Such a device is shown in the patent to Edwards, No. 701,024, issued May 27, 1902. After this cooling the bars may be conveyed away and annealed or otherwise treated.

It is an object of this invention to provide an apparatus which will receive bars or other articles separately as delivered directly from a rolling mill and which will stack them in piles for pack annealing.

Another object is to provide means for allowing slack between a mill and shears.

Another object is to provide improved means for removing stacks of annealed articles from the conveyor or cooling bed, for storing the articles, for separating the stacks, and for delivering the articles to a conveyor to take them to the place where the next operation is performed.

Another object is to construct a cylindrical skew roller mounted to swing in a horizontal plane and having a combined support and position restoring means.

Another object is to provide an improved stacking mechanism.

Other objects will hereinafter appear.

The invention will be better understood from a description of one practical embodiment illustrated in the accompanying drawings, in which, Fig. 1 is a fragmentary plan view of the parts of the run-out rolls of a rolling mill, the conveying mechanism for carrying stock therein, and mechanism for moving the stock from this conveyor to a conveyor which carries the stock to the shears.

The run-out of the mill comprises a horizontal table 1 provided with openings 2 in which rollers 3 are positioned, the tops of the rollers projecting above the table, so that bars or the like being received from the mill will move freely with them. Preferably the rollers are of the type described in my copending application, Serial No. 93,135, filed March 8, 1926, in which the stator or field is stationary and constitutes the central part of the motor, while the rotor or armature revolves thereabout and carries a cylindrical shell which acts as the roller proper.

The electrical motor employed in this unit differs from most electrical motors in that the shell for the motor revolves while the central part is stationary. In this application the term rotor is used to designate the outside revolving frame of the motor, while the fixed member is designated the stator, whether the current used be direct or alternating.

Figure 6:
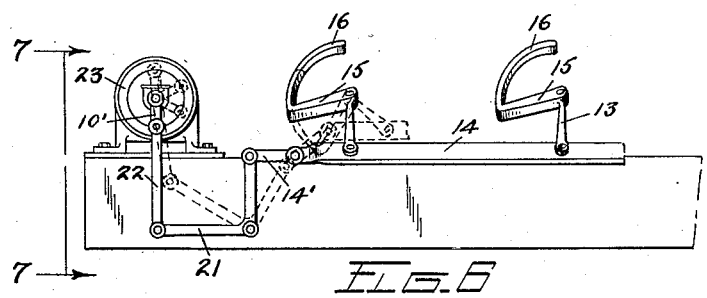
Figs. 6 and 7 are fragmentary side and end elevations of the operating mechanism for the elevator mechanism.
Figure 7:
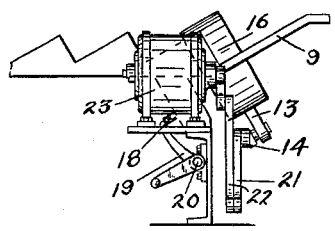
Figure 8:
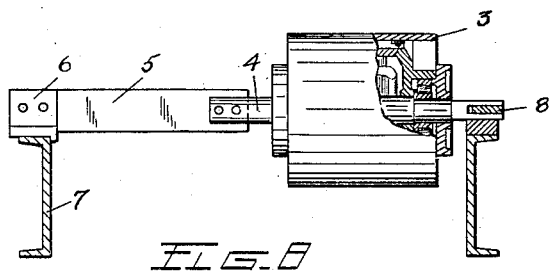
Figs. 8 and 9, are, respectively, a side elevation and plan view of the roller and its supporting means, which is used in the run-out of the mill.
Figure 9:
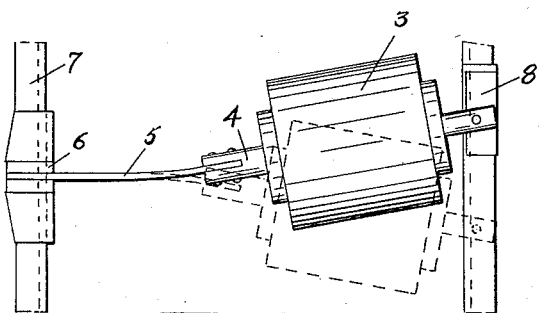

In the conveyor illustrated, the shaft through the center of the motor roller unit, and about which the armature and rollers proper revolve, is shown as bifurcated at one end, and in the opening is secured a thin strip of steel or the like, the other end of which is secured as at 6 to some stationary object, such as the channel member 7. The strip 5 that supports the motor maintains it sufficiently rigid as against all vertical forces, but permits it to be swung from side to side, due to the flexibility of the strip when it is subjected to horizontal forces, the elasticity of the strip tending to restore the unit to its normal position. The other end of the motor shaft 4 is connected to a rod 8 by which it can be moved to change the angularity of the roller axis with respect to the direction of travel of the bars upon the bed. The end of the motor shaft adjacent the rod 8 may also rest upon a guide along which it may slide and which assists in supporting the weight of the motor-roller and the material being carried thereby. It will be obvious that when the rod 8 is moved toward the top in Fig. 1, the bars being carried by the conveyor towards the top of the drawing would tend to move toward the right of this figure and will run off the rollers and slide down the inclined part 9 of the bed. Due to the change in shape of the flexible strip, not only does every point of the roller axis move when the roller is swung, but the curvature of the path of each said point increases as it is moved from normal position, the path so followed by each point of the roller axis being apparently a spiral. The bars slide down the incline to the bottom of the notch 10 from which they are delivered to the second notch 11 of a saw-tooth conveyor which may be of any desired type and which constitutes a hot bed on which the bars are annealed and, as they are annealed, are carried to a point where they may be placed upon the conveyor for taking them to the shears or the like. A series of elevators indicated generally at 12 are pivoted below notch 10, so that they may be extended through slots in the bed to raise each bar as it reaches the bottom of the notch and lift it into the second notch, placing it above any bars already positioned therein to stack the same in the second notch from which the stack may be removed by the conveyor mechanism. The elevators each comprise a crank arm 13 by which they may be actuated by a longitudinally extending rod or the like 14 pivoted thereto. The mechanism for operating this rod is illustrated in Figs. 6 and 7, and will later be described. Extending laterally from the arm 13 is a second arm 15 underlying the bed, and from its end an arcuate blade or vane 16 extends through a slot 17 to raise the bars.

Figures 3, 4, 5:
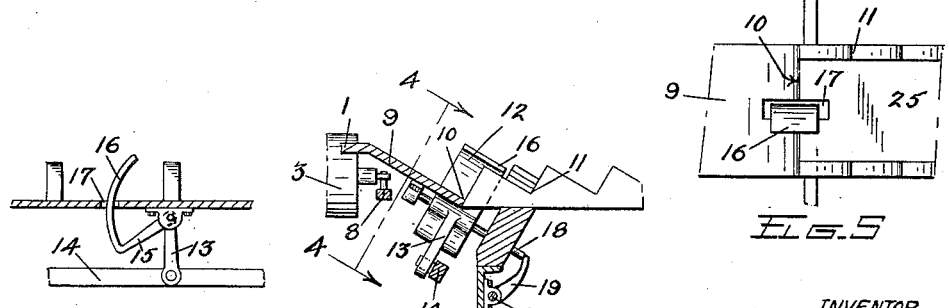
Figs. 3, 4 and 5 are fragmentary elevation and plan views of the elevating or stacking mechanism shown in Figs. 1 and 2.

The elevator is rigidly connected to a shaft 18 which is journaled in bearings supported on the lower side of the plate 9 through which it is free to slide axially. An arm 19 bears against the end of each shaft 18 as shown more clearly in Fig. 3 and the different arms are all keyed to a shaft 20, so that by rotating the shaft 20 the elevators may be slid along the slot 17 to accommodate piles of bars of different widths. Each time a bar is delivered by the rolls to notch 10, the entire series of elevators is simultaneously elevated and raises the bar from the notch, allowing it to slide sideways into the slot 11. If there are already bars piled in this notch, the elevator may be raised to a sufficient height to deliver the bar to the top of the pile. In Fig. 6 is shown a motor for operating the elevator. The motor may be operated by a stop switch to raise the elevators to several different heights and it is found in practice that three such heights operate satisfactorily. As shown in this figure, a bell crank 21 actuates the end of the rod 14 through a link 14' and the other end of the bell crank is connected by link 22 to a crank 10' carried by motor 23, which is controlled by the stop switch, not shown.

The bars are conveyed along the hot bed by being moved from one notch to the next successive notch by movable bars or beams 24 positioned between stationary beams 25 in any suitable manner, but preferably as disclosed in my above mentioned application.

At the end of the hot bed conveyor I provide a table 26 to which the bars may be delivered by the hot bed conveyor and upon which they may be stored, thus providing slack between the mill and shears so that either may be shut down without stopping the other. The stacks of material are carried to the surface of the table at the edge adjacent the hot bed by the last notch of the hot bed conveyor and when the conveyor beams are lowered the lowest corner of the bottom bar engages the table first, thereafter rotating the stack to a vertical position. Upon the next stroke of the conveyor beams, their vertical ends engage the side of the stack and push it further onto the table to make room for the next stack. Thus any number of contacting stacks may be pushed across the table.

Figure 1:
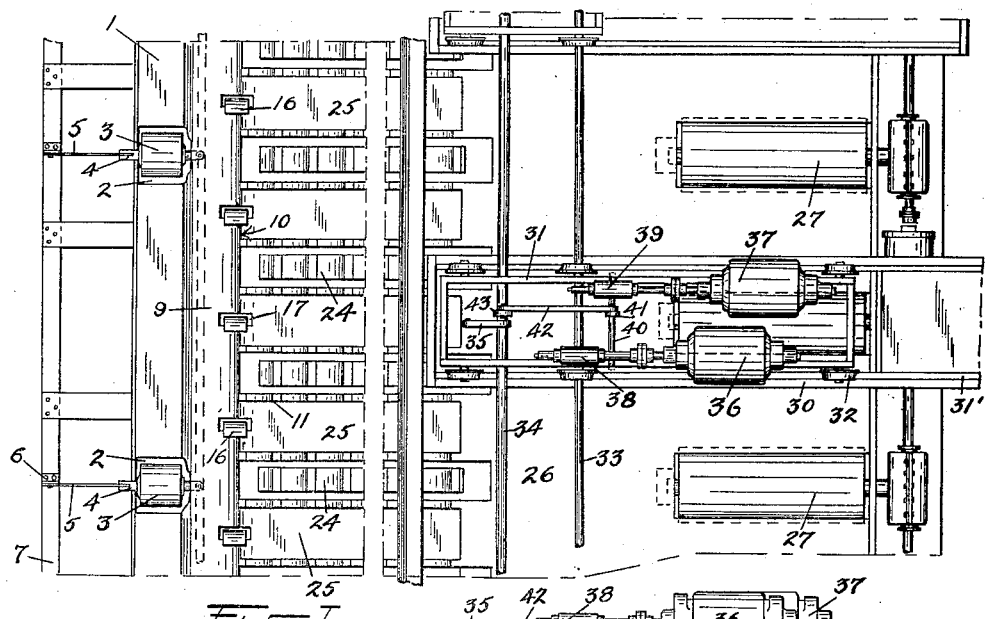
Figure 2:
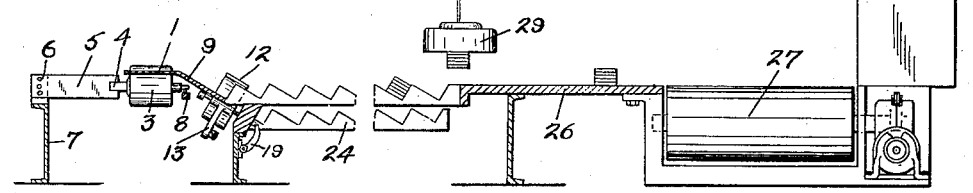
Fig. 2 is an elevation partly in section of the mechanism shown in Fig. 1.

Magnetic means are provided for moving the piles of bars about on the table 26 and from the table to the conveyor rolls 27. These comprise series of magnets 29 suspended from trolleys moving on tracks 30 which project above the rollers 27, table 26 and the end of the hot bed. The trolleys each comprise a frame 31 supported on wheels 32 which roll on the tracks 30. A shaft 33 extends through all the trolleys and acts as an axle for one pair of wheels on each trolley. A shaft 34 likewise extends through each of the trolleys and is provided in each trolley with an arm 35 keyed to it, from which the magnet is suspended. As illustrated in Figs. 1 and 2, one of the trolleys, hereinafter referred to as the master trolley, is provided with an extended frame indicated at 31' which carries motors 36 and 37.

Motor 36 operates reduction gearing 38 which drives shaft 33, thus moving the trolleys simultaneously along their respective tracks. Motor 37 drives through reduction gearing 39 and rotates a short shaft 40 carried by the master trolley. Upon this shaft 40 is keyed a crank 41 which is connected by a link 42 to a crank 43 keyed to shaft 34, so that movement of the shaft 40 rotates shaft 34, elevating or lowering the magnets 29. It will thus be seen that the number of motors necessary for a series of cranes is reduced to two and the control thereof correspondingly simplified. Stops 44 are provided at the end of each track to prevent the trolleys from running off of the same and also to permit alignment of the trolleys, should they become disaligned, by running them all against their respective stops.

The stacks of material are taken from the table 26 or the hot bed to the conveyor rolls, and there are separated by rapidly reversing the current through the magnets 29, each reversal permitting the bottom bar of the stack supported by the magnet to drop off and be conveyed away by the rollers.

The magnets 29 may be selectively energized, so that stacks or bars may be stored at one end of the table 26 and stacks at the other end carried to the conveyor rollers. Preferably table 26, or the part thereof under the magnets, is constructed of non-magnetic material as this increases the efficiency of the magnets.

Preferably the rollers 27 are provided with magnetic means which increase the traction between the same and the bars, and such increased traction allows the space between the rollers to be very materially increased. Idlers may be provided between the driven rollers if desired.

By the apparatus above described, I obtain the following advantages:

By delivering the bars directly to the hot bed by the rollers, the apparatus has been rendered more compact than where a throw-off was inserted between the run-out rolls and the hot bed. The bars may be conveniently stacked in stacks of any desired height and any width of material. Bars may be stored upon the table 26, so that the shears may be shut down without necessitating stopping of the mill. The stacks or bars may be simply separated to be delivered to the shears. The controls of the stacking mechanism and also of the cranes and magnets are extremely simple and efficient.

While I have described in some particularity one embodiment of my invention, it will be obvious to those skilled in the art that many changes and variations may be made without departing from the scope of the invention and I therefore do not limit myself to the precise details set forth, but claim as my invention all variations and modifications thereof coming within the scope of the appended claims.

I claim:

1. In combination with a cooling bed, an inclined trough adapted to receive material from a run-out, a stacking mechanism for transferring the material from said trough to the cooling bed consisting of a plurality of vanes, means for rocking the vanes about inclined axes and means for effecting lateral movement to said vanes to compensate for materials of various widths.

2. In combination with a cooling bed, a trough having an inclined bottom and being adapted to receive material from a run-out, and mechanism for stacking on the cooling bed material discharged from the run-out into the trough, the said mechanism including vanes rotatably mounted on inclined axes substantially parallel to the bottom of the said trough, and means attached to said vanes for rotating the latter about their axes to lift material from said trough and deposit it on said cooling bed.

3. In combination with a cooling bed, a trough having an inclined bottom and being adapted to receive material from a run-out, and mechanism for stacking on the cooling bed materal discharged from the run-out into the trough, the said mechanism comprising a plurality of spaced shafts beneath the trough, lifting vanes on said shafts and having their material engaging surfaces substantially parallel to the inclined surface of the trough, and means associated with said vanes for rotating the latter about the axes of the shafts to lift material from said trough and deposit it on said cooling bed.

4. In combination with a run-out and a cooling bed, a trough disposed to receive material discharged from said run-out, and stacking mechanism adapted to transfer material from said trough to said cooling bed, the stacking mechanism comprising lifting vanes rotatable about fixed axes beneath the trough, the vanes having material engaging surfaces, inclined at an angle greater than the angle of repose of the material to be transferred, and means connected to the vanes for rotating them about their axes and lifting the material on their said surfaces from the trough and depositing on the said cooling bed.

5. In combination with a run-out, a cooling bed and a trough disposed to receive material from said run-out, a stacking mechanism for lifting material from said trough and depositing it on said cooling bed, the said lifting mechanism comprising a plurality of rotatable vanes having material engaging surfaces inclined at an angle greater than the angle of repose of the material to be stacked, means connected to said vanes to rotate the latter and lift material from the trough on said inclined surfaces, and means associated with said vanes for shifting the latter axially to accommodate materials of different widths.

In testimony whereof I hereunto affix my signature this 6th day of March, 1926.

WILLIS McKEE.